United States Patent [19]

Lincoln et al.

[11] Patent Number: 4,589,357
[45] Date of Patent: May 20, 1986

[54] METHOD FOR REDUCING COMMINUTION ENERGY OF A BIOMASS FUEL

[75] Inventors: James F. L. Lincoln, Auburn; Manfred K. Buder, Federal Way; Craig A. Brown, Puyallup; Gregory P. Golike; Robert M. Spurrell, both of Auburn, all of Wash.

[73] Assignee: Weyerhaeuser Company, Tacoma, Wash.

[21] Appl. No.: 768,306

[22] Filed: Aug. 22, 1985

[51] Int. Cl.$^4$ .............................................. F23D 1/00
[52] U.S. Cl. .................................... 110/347; 110/222; 110/224; 110/232
[58] Field of Search ............... 110/341, 347, 224, 232, 110/222, 346

[56] References Cited

U.S. PATENT DOCUMENTS

| | | | |
|---|---|---|---|
| 3,229,651 | 1/1966 | Wasp | 110/347 |
| 3,831,535 | 8/1974 | Baardson | 110/8 C |
| 4,229,183 | 10/1980 | Eneroth et al. | 44/1 D |
| 4,235,174 | 11/1980 | Spurrell | 110/346 |
| 4,249,470 | 2/1981 | Vatsky | 110/232 |
| 4,333,405 | 6/1982 | Michelfelder et al. | 110/264 |
| 4,423,689 | 1/1984 | Merz et al. | 110/347 |
| 4,426,938 | 1/1984 | Leikert et al. | 110/347 |
| 4,436,038 | 3/1984 | Leikert et al. | 110/347 |
| 4,532,873 | 8/1985 | Rivers et al. | 110/347 |

OTHER PUBLICATIONS

Fagerlund, Bertil, "How Some Scandinavian Mills Get Higher Fuel Value From Bark", *TAPPI*, vol. 63, No. 3, pp. 35-36, (1980).

Schwieger, Bob, "Power From Wood", *Power*, 124(2): S1-S 32 (1980).

*Primary Examiner*—Edward G. Favors

[57] ABSTRACT

The present invention relates to the preparation and burning of biomass-derived fuels such as wood waste or peat. Wood waste or "hog fuel" from the forest industries is of particular interest. Normally the entire stream of this material must be finely ground if it is to be successfully burned in an air suspension burner without any fossil fuel support. It has now been discovered that a bimodally sized fuel can be used. Only about 10-20% of the total heat energy is provided from a portion ground to a size less than about 100 $\mu$m. This serves as an ignition component for a principal fuel which may be of much larger size. The usual hog fuel pile contains both bark and wood. Of these two materials, bark is much more friable and easily ground to fine particle size than wood. A major reduction in grinding energy is achieved by selecting the more friable material to be ground to fine size as the ignition fuel. The more resistant material is used as the principal fuel. When using a bimodal system, best results are obtained when the amount of ignition fuel sent to the burner is maintained constant. Load swings are accommodated by varying only the principal fuel component.

16 Claims, 11 Drawing Figures

METHOD FOR REDUCING COMMINUTION ENERGY OF A BIOMASS FUEL

BACKGROUND OF THE INVENTION

This invention deals with recovery of heat values from biomass material such as wet wood waste, peat or the like. Of particular interest is the recovery of energy from waste generated by the forest products industries, commonly called "hog fuel".

As fossil fuel costs have oscillated, operators processing wood as a raw material, especially in sawmills, pulp mills and composite wood products operations, have become more interested in recovering the heat energy value of wood wastes that are otherwise unsuitable for conversion into salable products. Many facilities generate a sufficient amount of such waste to meet significant portions of their energy requirements. Others have access to supplies of other biomass materials such as peat or whole tree chips which, if suitable methods of heating value recovery were available, could constitute a low cost replacement for fuel oil or natural gas.

Wood wastes from sawmilling and related raw wood handling operations have a number of characteristics that make efficient recovery of heating values difficult. The waste is usually wet, often in excess of 50 percent moisture by weight. Each mill source of waste has its own characteristic composition and moisture content. Much sawmill and pulp mill waste is accumulated and stored out in the weather where it soaks up rainwater during wet periods of the year.

A second problem with wood waste is that it varies greatly in size. These wastes are generated from every wood handling and processing operation. The wastes range from sander dust of 0.1-3 mm particle size to log yard debris which may exceed dimensions of 200 mm in diameter and be over a meter in length. The wood waste is often comminuted or "hogged" to break up oversize material by means of a hammer mill, producing wood waste or "hog fuel" having a particle size of less than 100 mm. Secondary hogging may further reduce size to less than 25 mm. The waste from a sawmill will contain a fair percentage of much smaller particles originating as sawdust.

A common practice in the past has been to burn wet hog fuels on a grate in a combination oil-wood waste boiler. The supplemental oil permits the boiler to more easily follow process demand variations for steam, and sustains combustion in the situation when the hog fuel is very wet. Finer portions of the hog fuel waste may be burned in air suspension, as by means of a swirl stabilized burner of the type described by Michelfelder et al. in U.S. Pat. No. 4,333,402.

Recent techniques of heat recovery from hog fuel require a reduction in moisture content of the hog fuel before it is fed to the boiler. Studies show that reducing the initial moisture content of the fuel improves steam production and reduces boiler stack emissions. A state-of-the-art process that dries a portion of the fuel prior to burning and burns a substantial amount in air suspension is described by Spurrell in U.S. Pat. No. 4,235,174. In this process, the largest size material from the hog fuel pile is burned in a fluid bed burner. The combustion products from the fluid bed burner are then used to dry the balance of the hog fuel in a rotary dryer before it is fed into a combination oil-wood waste boiler. The dried fuel is separated by size. The coarser fraction, up to about 100 mm in maximum dimension and at about 35% moisture, burns on a furnace grate while a fines fraction, at about 15% moisture and a particle size of less than ⅛ inch (3.2 mm) diameter, is injected in air suspension into the boiler.

The Spurrell process, however, requires an oil pilot on the injected fines portion of the fuel in order to sustain stable combustion. This oil pilot represents a substantial use of fossil fuel, up to 30% of the total burner rating at full burner loads.

Certain wood wastes have in the past been recognized as burnable in furnaces without a grate or supplementary oil support. For example, sander dust which is of very fine particle size distribution and about 5% moisture content has been burned successfully in air suspension. Schwieger, in an informative survey article entitled "Power from Wood", Power, 124 (2): S1–S32 (1980), describes sander dust, at about 12% moisture, as being fired to a package boiler. The top size of this material is said to be about 800 $\mu$m. Even so an oil pilot is recommended, suggesting unstable combustion conditions.

Very fine materials such as sander dust, however, generally constitute only a very minor portion of the waste available at the typical wood processing mill, particularly those integrated with pulp production facilities. The amounts of these dry, fine wood wastes at most facilities are usually not sufficient to meet a significant percentage of the energy requirements of the typical mill. However, at many facilities generating wood wastes the hog fuel pile as a whole has this capability.

Certain larger size and higher moisture ranges of wood material, even when the wood waste is over 60% moisture content, can be burned without oil support where combustion is carried out in refractory lined furnaces or kilns. In a refractory furnace the firebox is lined with ceramic which attains a temperature of roughly 800° C. (1500° F.) or higher. The hit gases then contact the steam generating tubes. The heat retained by the mass of ceramic is continually reradiated to help sustain stable combustion in the fire box, permitting otherwise difficult-to-burn materials or wastes to be burned without oil support. Refractory furnaces have a high initial cost and the effects of high firebox temperatures result in high maintenance costs. They also normally require a larger boiler tube surface area since the tubes have poor exposure to the hottest part of the flame.

In a hog fuel burning system described by Baardson in U.S. Pat. No. 3,831,535, wood waste is dried and pulverized to a maximum particle size of 5/16" (7.9 mm). This material is accumulated in a bin and injected for combustion in a refractory lined chamber where radiation from the refractory provides support for stabilized combustion.

Because of lower capital costs for construction and lower maintenance costs, industry favors the use of "water-wall" boilers wherein the flame is substantially surrounded by water tubes which generally reach only about 315° C. (600° F.). In these boiler configurations, the walls are relatively cold compared to the flame and are more efficient heat absorbers. The absence of hot firebox refractory surfaces reduces the amount of radiation support available to help sustain the ignition process. As a result, suspension firing of water-wall boilers with conventionally available hog fuels has generally required the use of a fossil fuel pilot to continually provide energy to raise the fuel to ignition temperature.

A more recent approach to burning the larger fraction of the hog fuel pile has involved pulverizing the hog fuel to a smaller particle size range than that of Baardson. Eneroth et al. in U.S. Pat. No. 4,229,183, teach improved hog fuel burning by simultaneously grinding and drying the fuel to 10–15% moisture. The flow from the pulverizer enters a cycline which separates the fuel from the air flow. The fuel is then re-suspended in air and injected into a boiler. No grate is required. Fagerlund, Tappi 63 (3): 35–36 (1980), further describes the Eneroth method as grinding the wood fuel down to a particle size of 1–3 mm. An oil pilot equivalent to 5% of the burner rating is required for flame control. Fagerlund expresses the hope that control systems will be developed in the future so that no auxiliary oil will be needed.

Rivers et al. in U.S. Pat. No. 4,532,873, commonly assigned with the present application, describe a method used to prepare wet fibrous vegetable matter fuels, including hog fuel, for suspension burning in a water wall heat recovery boiler. This method does not require a gas or fuel oil pilot for stability. However, it does require drying the hog fuel stream and pulverizing it in its totality to a very fine particle size. The resulting fuel is preferably all less than 1 mm with at least 15%, preferably at least 40% less than 150 μm.

Leikert et al. in U.S. Pat. No. 4,436,038 describe a system for burning pulverized coal in an air suspension burner in which a portion of the finest particle size material is separated. While the inventors are somewhat unclear as to the use of this fine material, it appears to serve as fuel for an initial igniting flame or pilot light rather than as a material that is used continuously to sustain the flame.

The use of a continuous oil pilot, even in quantities as small as 5%–10% of the total heat input, can become very expensive. As an example, assuming a 10% fuel oil requirement, a suspension fired boiler producing 225,000 kg/hr of steam would consume 10–12 bbl of oil/hr or approximately 100,000 bbl/year. At a price of $26/bbl this approaches $2.5 million/year for supplemental fuel.

Pulverizing the entire fuel stream to fine particle sizes, as described by Rivers et al., is expensive in terms of capital, maintenance and operating costs. Wood and other fibrous biomass material are inherently much more difficult to pulverize than coal, for example. For a hog fuel source consisting of about 75% wood fiber and 25% bark, if this is dried to 15% average moisture and presized to pass through a 6.4 mm (¼ in) screen, grinding energy to produce a product containing 40% less than 100 μm in size is about 95 kW.h/t. By way of comparison, coal precrushed to about 0.5 mm only requires 11–21 kW.h/t to produce a product with 80% passing a 74 μm (200 mesh Tyler series) screen. The exact power required will depend on coal rank and the particular equipment chosen.

Bark is known to be easier to comminute than wood. If the hog fuel source noted above was composed of 25% wood fiber and 75% bark, with all other parameters being similar, grinding energy would be about 28 kW.h/t. This is about 1.8 times greater than coal if 16 kW.h/t is used an average figure for the latter material.

With a 75% wood fiber and 25% bark hog fuel source, using the process described by Rivers et al., for a $2.25 \times 10^5$ kg/hr power boiler, annual grinding energy consumption would be about $1.3 \times 10^8$ MJ. At the optimistic power rate of $0.011/MJ the annual power cost for fuel grinding alone would be about $1.4 million/year.

Mill experience clearly indicates that pulverizer reliability is a serious problem. High-speed impact mills are the only practical machines capable of continuously pulverizing the required amounts of woody types of biomass used in a Rivers-type process. Past experience using this type of mill with hog fuel has shown 10% or more downtime on each pulverizer for maintenance.

With the present state of the art in pulverizing hog fuel, in order to conduct a commercial operation, one must either expend capital to purchase oversize and/or backup pulverizers or burn oil during pulverizer downtime. None of these alternatives are particularly attractive.

Other biomass materials, such as peat for example, are similar to hog fuel in that they are wet and of unsuitable physical form or size. Thus, these potential fuels are generally not utilized in many parts of the world. While the discussion which follows focuses upon wet wood waste or hog fuel, the invention is applicable to any wet biomass matter.

It can be said in summary that the present state of the art for burning biomass materials such as hog fuel in air suspension in a water-wall boiler requires either a stabilizing fossil fuel pilot or drying the biomass material and grinding it in its entirety to a fine particle size.

SUMMARY OF THE INVENTION

The terms listed below are used throughout the present specification and are defined here to have the following meanings.

"Biomass fuel" is used to mean any fuel derived from once living plants. These plants may be trees or brushy species. A biomass fuel should be considered to include peat or peaty materials.

"Wood waste" or "waste wood" is any burnable tree-derived waste generated in forest industries operations such as forest residuals from logging or waste from sawmills and pulp mills.

"Hog fuel" is wood waste generally reduced to a particle size less than about 100 mm for greater ease of burning. Hog fuel contains widely varying percentages of wood and tree bark.

"Wood" or "wood fiber" is the lignocellulosic portion of a tree formed inwardly from the cambium layer of cells.

"Bark" is the portion of a tree consisting, according to species, of the phloem tissue, corky material, and bast fibers, that grows outside the cambium layer of cells.

"A "hog" or "hammer hog" is a relatively low energy, high throughput hammermill used to break down large chunks and slabs of wood and bark into smaller particles more readily usable as fuel.

A "pulverizer" is a relatively high energy impact-type hammermill designed to break down relatively coarser particles into very fine particles, generally much finer than 1 mm average particle size.

The present invention is directed to a process for burning a particulate biomass fuel using an air suspension burner in a water-wall or other cold wall-type boiler or in other direct fired equipment where high amounts of heat energy are required. The process does not require the use of a fossil fuel pilot source. It is particularly advantageous for use with burners operating over a wide range of load conditions. The invention is further concerned with a method for reducing the necessary energy to prepare the biomass fuel for burning.

An important aspect of the invention is the use of a fuel having a bimodal particle size distribution. This will consist of a principal fuel component which is relatively coarse. At least 90% by weight of the particles should not generally exceed about 10 mm in any dimension nor should they have a moisture content exceeding about 25%. If the fuel is to be used in a boiler lacking a grate, the particle size of the principal fuel source should preferably not exceed about 1 mm in thickness in order to prevent fallout onto the floor of the boiler.

A predetermined portion of very fine particle size material is used along with the principal fuel source to act as an ignition fuel for the coarser particles. This fine particle size ignition fuel component should have a diameter not exceeding about 100 $\mu$m and should comprise at least 10% of the heat value of the total fuel burned when the burner is fired at full load. The specified particle size is preferably determined by the use of a Malvern Laser Particle Size Analyzer, available from Malvern Instruments Ltd., Malvern, England. Particle size distribution may also be determined using standard Tyler sieve series screens, or by other methods which can be correlated to the equivalent Malvern diameters.

The principal fuel component and the ignition fuel component are delivered to a burner while suspended in a stream of primary air. It is within the scope of the invention to combine the fuel sources prior to delivery to the burner or to deliver them separately.

In a key and novel aspect of the invention, burner load changes are accomodated by varying the amount of principal fuel component supplied to the burner while maintaining the ignition fuel component essentially constant. At higher turndown ratios, when the burner is firing at less than full capacity, the ratio of ignition fuel component to principal fuel component is increased. By thus modulating the principal fuel component, the burner can be operated over a range of turndown conditions of at least 2.5:1 without the need for any supplemental fossil fuel.

The discovery of the usefulness of modulating one component of a bimodal particle size distribution fuel, as described above, opens the door to a major saving in fuel preparation costs, for example, as compared with the Rivers et al. process where experience has shown that the entire fuel supply must be relatively finely ground. With the present invention it is only necessary to finely comminute a relatively minor portion of the fuel. It makes little difference what component or components comprise this fine portion. Where a forest products mill hog fuel is being utilized, it could be entirely wood fiber, or entirely bark, or some mixture of these. It could also be peat or boiler fly carbon where these materials are available. The use of the bimodal size distribution fuel has the further advantage of greatly simplifying the control system required for a burner operating under varying loads.

Wood and bark are known to have very different friabilities when subjected to grinding. In general, materials such as bark or peat require far less energy than wood fiber for grinding to a given particle size. This knowledge can be used to advantage by selecting a stream from the available wood waste that will have a low grinding energy requirement for preparation of the ignition fuel component.

The discovery that a bimodal size distribution fuel may be advantageously employed in which the coarser particle size is modulated to accommodate burner load swings, and the further discovery that the differential friability of feed materials can be used advantageously, add up to a major technical and economic advantage for the process of the present invention.

It is an object of the invention to provide a method for burning a particulate biomass fuel which can be used in an air suspension burner in a cold wall-type boiler over a wide range of load conditions without the need for supplemental fossil fuel.

It is a further object to provide a method for burning a biomass fuel having a bimodal particle size distribution.

It is another object to provide a biomass fuel in which a very fine particulate component provides ignition energy for a much larger particle size component.

It is yet another object to provide a biomass fuel having a bimodal particle size distribution in which the ratio of coarser to finer particles is changed to accommodate burner load swings.

It is still a further object to provide a process which significantly reduces energy required for comminution of a biomass fuel which will enable stable combustion in an air suspension burner without the need for supplemental fossil fuel.

It is also an object to provide a biomass fuel in which comminution energy is reduced by taking advantage of the differential friability of the various components in the fuel source.

These and many other objects will become readily apparent to those skilled in the art upon reading the following detailed description taken in conjunction with the drawings.

DETAILED DESCRIPTION OF THE PREFERRED EMBODIMENTS

The term "hog fuel" is used generically within the forest products industries to describe any wood waste material which can be burned for fuel. It will vary widely in size distribution and composition depending on the nature of the process where it is created. As one example, hog fuel from a pulp mill will tend to have high bark contents and relatively lower amounts of wood fiber. A bark content of 80% would not be uncommon. Hog fuel created in a sawmill could range from about 20% bark content down to no bark at all. A third source of hog fuel, log sort-yard waste, varies so widely in composition from site to site that no generalizations can be made. In many cases, larger mills with high power needs may purchase hog fuel from a number of regionally located smaller mills.

Wood waste for processing into hog fuel can vary in size from sander dust, having particle diameters as low as 0.1 mm to trim ends of logs and other large chunks having maximum dimensions of a meter or greater. The material is normally run through a "hog" or relatively low energy hammermill. The fuel thus initially prepared will have maximum dimensions which may range from 75–100 mm but will contain a significant percentage of much finer material as well.

The hog fuel from one mill was sampled and analyzed over a considerable time period in order to obtain an approximation of an average composition. This particular mill is a magnesium based sulfite mill pulping predominately Western hemlock supplied as roundwood and sawmill residuals as well as purchased chips. The hog fuel pile is augmented by material purchased from other mills in the area, predominately sawmills.

Material from the hog fuel pile was first passed over a disk-type scalping screen to remove any large chunks in excess of about 75 mm in any dimension. Accepted material was then analyzed for particle size distribution and bark content with the results being shown in Table 1

TABLE I

| | Hog Fuel Analysis | |
|---|---|---|
| | % Retained on Screen as | |
| Screen Size, mm | Wood | Bark |
| 64 | 0.0 | 0.0 |
| 32 | 0.3 | 0.4 |
| 16 | 2.4 | 6.0 |
| 8 | 7.8 | 12.4 |
| 4 | 4.5 | 6.2 |
| 2 | 13.9 | 4.6 |
| 1 | 13.8 | 6.8 |
| 0.5 | 7.7 | 5.2 |
| Pan | 2.4 | 5.5 |
| Total Concentration (%) | 52.8 | 47.1 |

No claim is made that the hog fuel from this mill is an average or even a typical material. Each hog fuel source will be essentially unique.

It is immediately apparent that the sample described above was composed of approximately equal parts of wood and bark. What is somewhat surprising is that the portion larger than 4 mm consists of 62% bark and 38% fiber. However, this situation is almost exactly reversed in the material finer than 4 mm which has 63% fiber and 37% bark. A similar trend; i.e., bark being more heavily concentrated in the coarser fractions, has been noted in hog fuel samples obtained from other sources as well. This tendency to concentrate bark in the coarser fractions may be in part a characteristic action of wood hogs which could preferentially reduce the size of wood as opposed to bark, although this is not known with any certainty.

Most hog fuel as taken from the pile tends to have quite high moisture content. Hog fuel is typically stored out of doors where it soaks up rain during wet weather without a compensatory amount of drying in more favorable weather. Before it can be effectively burned, particularly in a suspension type burner, it must be dried to some minimum moisture content and further reduced in size. This leads to a number of possible unit operations sequences. Comminution and drying may be done simultaneously or comminution and classification may be done simultaneously. It is also possible for classification and drying to be done simultaneously or for communition, classification and drying all to be done simultaneously. Hogs are not designed for producing product streams having very fine average particle sizes. Where smaller average particle diameters are required a high energy input grinder which emphasizes size reduction by impact and/or attrition is desirable. Grinders of this type are available commercially from a number of manufacturers and differ somewhat in their mode of operation. One type employs a relatively low air flow with the material being comminuted, uses an internal classifier, and is designed to give a relatively long retention time within the device. Another type, sometimes called a wind-swept pulverizer, uses a relatively high air flow to emphasize a short retention time within the device. This type normally uses an external classifier to separate the finer particles and recycle the coarser material for an additional pass or passes through the grinder. A machine of the low air flow type is available from the Pulverizing Machinery Division of Mikropul Corp., Summit, N.J. Its operation is described in the aforementioned Rivers et al. application and in U.S. Pat. No. 3,285,523 to Duychinck et al. A mill of the high air flow type is available from C-E Raymond, Chicago, Ill. This is a high speed impact pulverizer with an external aerodynamic classifier.

A low air flow pulverizer may employ an air-to-solids weight ratio as little as 1:1 or even slightly lower, whereas the high air flow pulverizer will normally use an air-to-solids ratio in the range of 5:1 to 10:1.

It is well established that the power required for comminuting any given material is proportional to the surface area generated. The surface area, in turn, relates directly to particle size and shape. It is almost self-evident that to minimize grinding costs of a fuel it should be reduced in particle size no more than is absolutely necessary. What has not been at all self-evident is that a bimodal size distribution can be advantageous, and that boiler load swings can be accommodated by modulating the amount of coarser fraction supplied to the burner while maintaining the finer fraction at an essentially constant flow rate.

Figure 1:
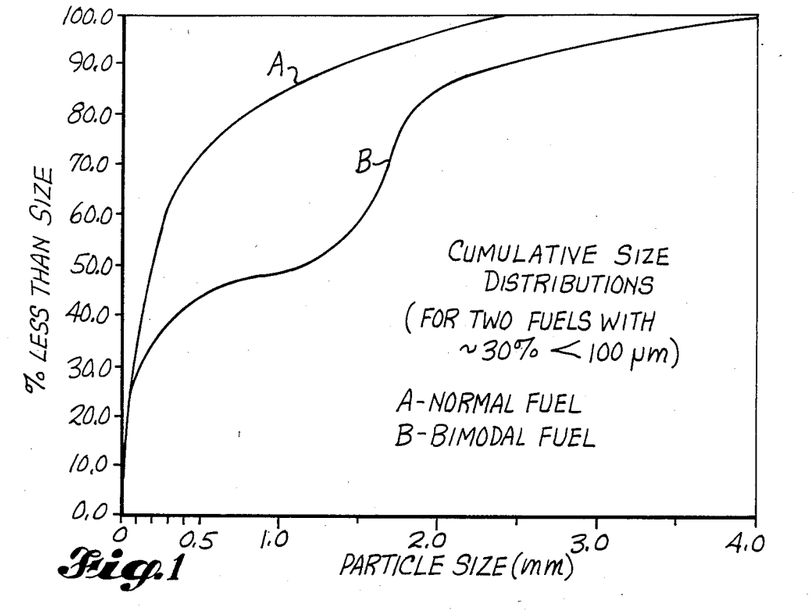
FIG. 1 is a graph showing cumulative size distributions of fuels having bimodal and normal particle size distributions.

A solid particulate bimodal fuel is characterized by a frequency distribution curve which contains two peaks reflecting relatively high concentrations of coarse and fine particles with a relative depression in the midsize particle range. The cumulative size distributions of a normal (Rivers et al. type) and a bimodal type are shown in FIG. 1 and the following table. Each fuel type has about 30% less than 100 $\mu$m particle size.

TABLE II

Bimodal vs. Normal Fuel Cumulative Size Distributions

| % Less Than | Bimodal | Normal |
|---|---|---|
| 25 μm | 10 | 7 |
| 50 | 17 | 17 |
| 100 | 27 | 30 |
| 150 | 32 | 42 |
| 200 | 35 | 49 |
| 250 | 37 | 50 |
| 300 | — | 62 |
| 400 | — | 67 |
| 500 | 44 | 73 |
| 750 | 47 | 79 |
| 1000 | 49 | 84 |
| 2000 | 86 | 97 |
| 4000 | 100 | 100 |

The data presented in the above table and graph were obtained by first screening the fuel samples through a 1 mm mesh size screen. The material that passed through the screen was analyzed on a Malvern laser particle size analyzer. That which was retained was analyzed on an Alpine Jet Sieve.

These data can be presented somewhat differently to better show the bimodality.

TABLE III

Bimodal vs. Normal Fuel Size Distributions

| Size Range | Bimodal | Normal |
|---|---|---|
| >100 μm | 27 | 30 |
| 100–1000 μm | 22 | 54 |
| <1000 μm | 51 | 16 |

Steam generating boilers vary widely in construction. Where biomass based fuels are concerned it is quite possible that the boiler may have originally been designed for use in whole or part for another fuel, such as oil or gas. These boilers may or may not have such features as grates or fly ash removal equipment. The nature of the boiler will affect somewhat the characteristics of a biomass fuel required for suspension fired burning. For a suspension fired boiler lacking a grate the principal fuel particles should have a maximum particle thickness (or minimum dimension) of about 1 mm if fallout onto the floor of the boiler is to be avoided. If total burnout within the flame envelope is desired, the maximum dimension should not exceed the 2–4 mm range. Otherwise, some carryover of unburned material into the flue gas may occur. This is normally not a serious problem since most wood fired boilers are equipped with fly ash separation equipment.

Much larger particles are permissible in the principal fuel component if the boiler is equipped with a grate. At least 90% of these particles should not generally exceed 10 mm in any dimension. This upper size limit is somewhat arbitrary and is in large part dependent on the individual installation. The actual permissible upper particle size limit for a grate equipped boiler is really the maximum size that can be suspended in the primary air stream without creating unstable feed conditions.

It is important to emphasize that the ignition fuel component in the amounts described is able to initiate and sustain a flame even when used with relatively much larger principal fuel particles.

The nature of the burner will also affect the required fuel characteristics. A swirl stabilized burner, such as that describe by Michelfelder et al. in U.S. Pat. No. 4,333,402, introduces the fuel suspended in a stream of primary air. An envelope of secondary air is simultaneously introduced to effect the proper aerodynamic flame stabilization. Using a burner of this type, the biomass fuel should contain about 20% of a fine component which does not exceed about 100 μm diameter with a moisture content that does not exceed about 15% when the burner is fired at full load. In a staged burner employing both secondary and teriary combustion air, the necessary amount of this finely ground ignition fuel is reduced to about 10% of the total fuel supplied at full load. These burners were originally developed for improved $NO_x$ emission control and are available from a number of manufacturers.

Depending on the particular burner being used, it may be desirable to supply the principal fuel component and the ignition component either as separate streams or mixed together as a single stream.

Continued operating experience has shown that a fuel of the type described by Rivers et al., as noted previously, required at least 40% very fine material if it was to sustain stable combustion at low burner loads. For this reason, as a practical requirement it was necessary to consistently supply a fuel having this high amount of very fine material. Only later was it shown that lower amounts of the fine fraction were acceptable when the burner was being operated at or near full load.

At the time the work was done on which the Rivers et al. application is based, particle size determination was normally made using a device sold commercially as the Alpine Jet Seive, available from Alpine American Corp., Natick, Mass. This apparatus uses standard Tyler screens but the material is air swept to prevent screen blinding. A more satisfactory measurement method has become available since that time. This is based on the Malvern Laser Particle Size Analyzer which appears to be more accurate and have better resolution, particularly in the small particle size ranges. However, this analyzer is not generally suitable when the sample has a significant amount of material greater than 1 mm. This larger material, if present, is normally removed first by conventional screening and an appropriate correction made in the final screen analysis. The Malvern analyzer uses the principle of far-field or Fraunhofer diffraction to calculate a size distribution from a measured diffraction pattern. More detailed information on this device is described in the following article: Weiner, Bruce B. *SPIE Seminar Proceedings*, Vol. 170, Optics in quality Assurance 2, pp. 53–62 (1979). The Malvern analyzer tends to see the particles in a random geometric orientation whereas analyzers based on screens tend to pass only those particles whose second greatest dimension is smaller than the screen openings. For this reason, a given sample analyzed by the Malvern tester will appear to have a smaller particle size than one analyzed using mechanical screens. The less than 150 μm particle size material discussed by Rivers et al. would appear as less than about 100 μm if measured by the Malvern instrument. It should be noted that no generalized correlation exists between instruments such as the Malvern and the Alpine Jet Seive. However, satisfactory correlations can be determined between these instruments when a specific material, such as a hog fuel from a single source, is being considered. All particle size measurements noted herein have been determined by the Malvern instrument.

Figure 2:
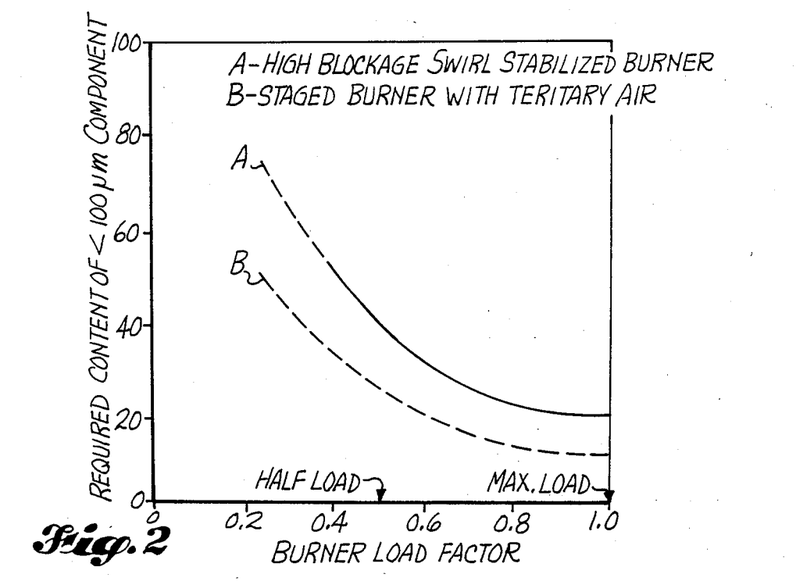
FIG. 2 has two curves showing the required content of fine ignition fuel as a function of burner load factor.

FIG. 2 is a graph showing two curves which indicate the required content of less than 100 μm ignition component in the fuel at various burner load factors. For a swirl stabilized burner of the Michelfelder-type about 20% by weight of the ignition component is required at full load. This increases to approximately 50% at a load factor of 0.4 (a turndown ratio of 2.5:1). Laboratory experiments designed to model a staged burner with tertiary air indicate that only about 10% of the fine ignition component is required at full load with a prediction that about 30% would be needed at a load factor of 0.4. The curves in FIG. 2 assume that burner operating conditions were set at maximum load and that swirl, blockage, excess air, etc. are not changed during turndown.

Past practice has been to modulate the entire fuel supply to the burner to accommodate load swings. In the method of the present invention the amount of fine ignition component supplied to the burner is maintained essentially constant while only the principal fuel, or coarser component, is modulated in response to load swings. This procedure automatically accommodates the need for a higher percentage of ignition component at low loads, as is shown in FIG. 2. The discovery that a constant supply of fine ignition component is required, regardless of burner load factor, gives new flexibility in the method of fuel preparation.

Figure 3:
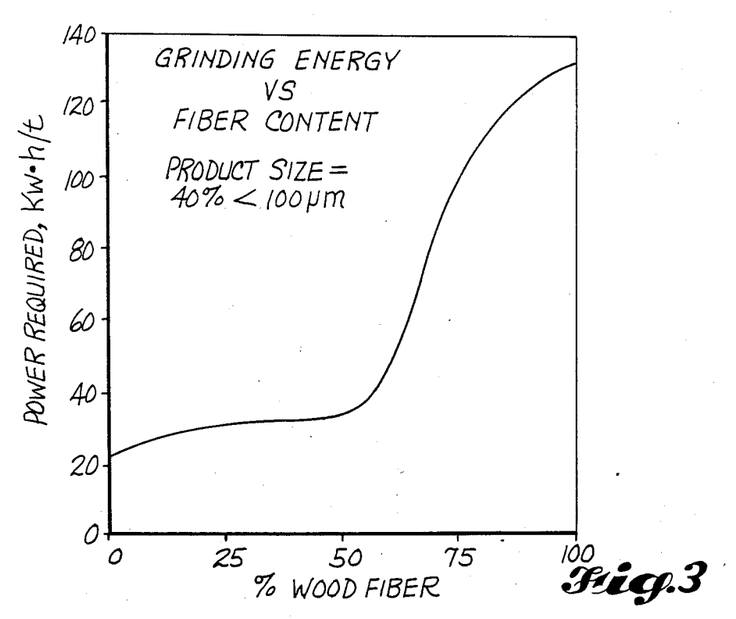
FIG. 3 is a curve showing the grinding power requirement for a low air flow-type impact mill as a function of the amount of wood in a wood-bark mixture to produce a given particle size product.

As was noted earlier, it is well known that some materials; e.g., bark and peat, are much more easily ground to fine particle size than is wood fiber. The curve shown in FIG. 3 is enlightening in this respect. There is little difference in grinding power requirement, regardless of wood fiber content, for a feed material having less than 50% wood fiber. If the wood fiber content increases beyond this point, there is a dramatic rise in power requirement to achieve a product having a given particle size. This knowledge can be used to advantage in the choice of grinder type. A high air flow type mill using external classification is particularly advantageous when the feed stream is a mixture of components having different friabilities. The most friable component is selectively reduced in size in preference to the less friable component. This less friable material would normally be returned from the external classifier for additional grinding but can also be used in the principal fuel component.

Figure 4:
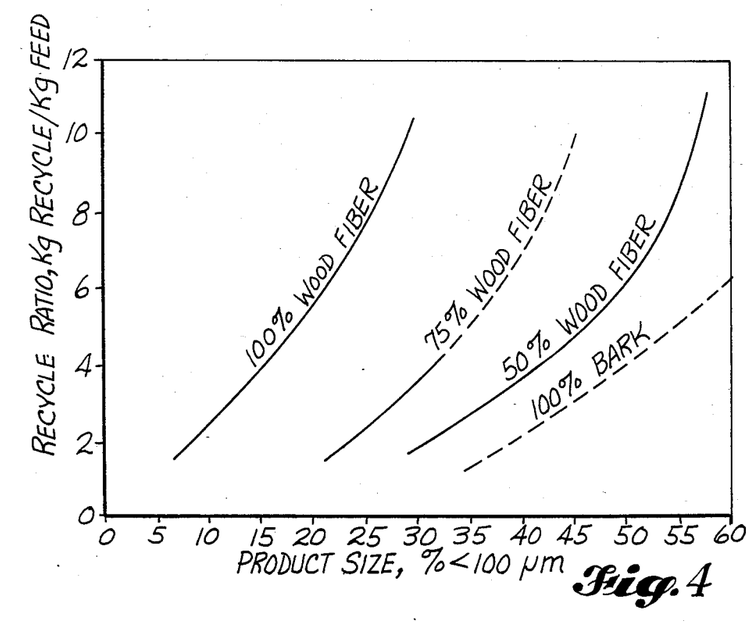
FIG. 4 is a curve family for several different infeed material compositions showing product particle size plotted against recycle ratio in one type of high air flow impact grinder using external classification.

FIG. 4 is a graph with a series of curves showing the recycle ratio required in a high air flow-type pulverizer with external classification to achieve given amounts of fine material with infeed streams varying from 100% wood fiber to 100% bark. As an example, one can consider the case in which the desired product from the pulverizer contains 40% fine particles less than 100 $\mu$m. With a 100% bark feed stream this product could be generated using a recycle ratio of material returned from the classifier to the pulverizer of about 2. If the feed stream had approximately equal quantities of wood fiber and bark, the recycle ratio would rise to approximately 3.6. Where the incoming feed stream had about 75% wood fiber, the recycle ratio would climb to 7.

The relationships just given apply equally to other types of pulverizers, such as low air flow types, that employ either an external or internal product classification operation. Knowledge of these relationships, taken with the discoveries of the present invention, enable a pulverizer installation to be optimized for minimum size and power usage for any given hog fuel source and boiler type.

Briefly stated, in that aspect of the present invention concerned with fuel preparation, only the required amount of fine ignition fuel is prepared and the most readily pulverized material is used for its preparation. This is based on the discovery that the absolute amount of ignition fuel needed is essentially constant, regardless of burner load, and the balance of the fuel need not be finely ground and can be varied to accommodate load swings.

FIGS. 5–9 show a number of proposed alternative processes for carrying out the present invention. It will be understood by those skilled in the art that these flow diagrams are exemplary and should not be considered as optimized for any given hog fuel source or boiler type.

Figure 5:
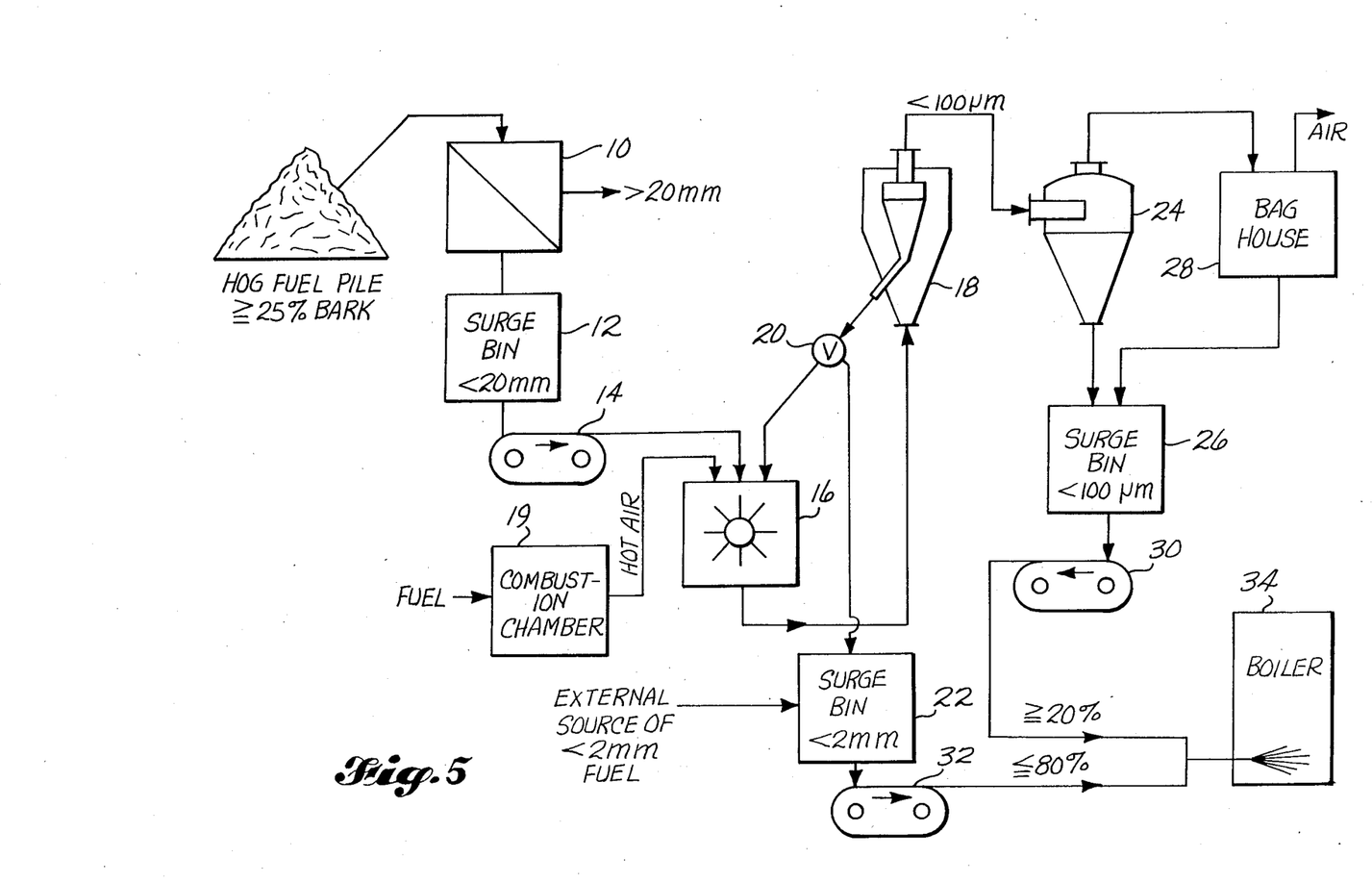
FIG. 5 is an exemplary flow diagram showing preparation of a bimodal boiler fuel using a high air flow impact grinder of the type used to generate the data graphed in FIG. 4.

FIG. 5 is designed for use with a hog fuel source having at least 25% bark for preparation of the fine particle size ignition component. It is assumed that a principal fuel component having a particle size less than 2 mm will be available from this or another hog fuel source. For preparation of the ignition component, the hog fuel is first run over a screen 10 to take out any chunks larger than about 20 mm in principal dimension. The oversize material can be utilized in a number of ways; e.g., for drying the fuel. The undersize material, less than 20 mm in maximum dimension, is temporarily stored in a surge bin 12 from which it is supplied by a weigh feeder 14 to a high air flow pulverizer 16.

One advantage of using a high air flow pulverizer is that the product may be simultaneously dried if the transport air is sufficiently heated. In the present example, hot air or combustion gases are supplied to pulverizer 16 from a combustion chamber 19. This could be of any type, for example a fluidized bed chunk burner as taught by Spurrell in U.S. Pat. No. 4,235,174.

The product from pulverizer 16 is fed to an aerodynamic classifier 18 which separates the particle stream on the basis of mass and particle size into a fine bark-rich stream and a coarser wood fiber-rich stream. The oversize material, now high in wood fiber, is directed to a three-way valve or damper 20 where it may be recycled to pulverizer 16 or sent all or in part to surge bin 22 which holds the principal fuel component. The fine material from classifier 18 is directed to a cyclone 24 from which it falls into a surge bin 26. Particle laden air exhausting from the cyclone is cleaned in a baghouse 28 from which the recovered material is also directed to surge bin 26.

It will be understood by those skilled in the art that other functionally equivalent types of classifiers may be used to control the material recycled to the pulverizer. It should also be noted that the material retained in surge bin 26 need not be 100% less than 100 $\mu$m in particle size. More typically the product contained therein might have an average size of about 100 $\mu$m and comprise about 50% material finer than 100 $\mu$m.

Fine material from surge bin 26 is then directed over weigh feeder 30 to the burner while the principal fuel component from surge bin 22 is similarly directed over weigh feeder 32. These two streams are combined prior to entering an air suspension burner in boiler 34. As burner load changes, the flow rate over weigh feeder 30 would normally be maintained constant while the principal fuel component being supplied over weigh feeder 32 would be varied. In any case, it is presumed that the combined fuel supplied to the burner would contain a minimum of about 20% having a particle size less than 100 $\mu$m when used with an unstaged Michelfeldertype burner.

There is an alternative to the process just outlined, that does not depend on the availability of an outside source of principal fuel component. All, or at least a major portion, of the biomass fuel can be directed through high air flow pulverizer 16. Most or all of the recycled material from classifier 18 is diverted through valve 20 to the principal fuel surge bin 22. By avoiding a recycle stream, the load on the pulverizer is greatly reduced. When using this essentially single pass system through the pulverizer, only the most friable material is ground to the less than 100 μm specification. This will normally be the bark fraction in the hog fuel. The more resistant wood fiber will pass through the pulverizers with some size reduction but it will not place a high energy demand on the pulverizer installation.

Depending on the amount of readily pulverized bark in the biomass fuel source, it may be desirable to supplement the stream to pulverizer 16 with additional bark or peat during periods of burner turndowns. This will ensure an adequate supply of ignition fuel component without the need to increase the recycle stream to the pulverizer.

Again, depending on the nature of the biomass fuel source, a significant portion of the principal fuel component may be provided by screening out the finer material prior to any comminution. This fine material is sent directly to the principal fuel surge bin. There is a twofold advantage to this procedure. It reduces dead load in the pulverizer by eliminating material that is already at an acceptable size. The fines are normally very high in wood fiber content and require disproportionately more power than bark to reduce them to ignition fuel size. Further, this fine fraction from a hog fuel pile contains much of the grit. This is very erosive material and can be a cause of high pulverizer maintenance. It is not untypical that 50% of the mineral grit in a hog fuel sample will be removed with the particle fraction less than 1 mm. in thickness. This fine fraction can be removed from either wet or dried biomass fuel using any standard screening equipment such as disk or gyratory screens.

Figure 6:
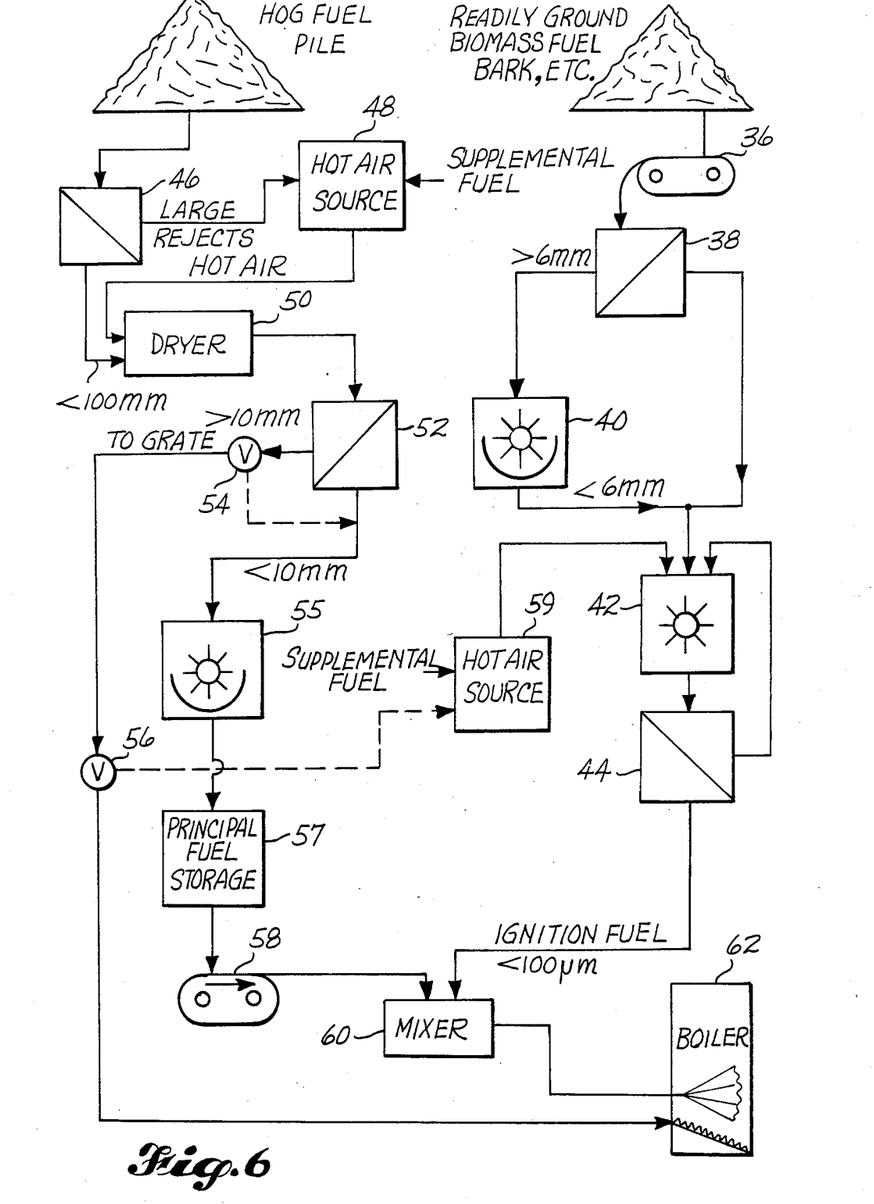
FIG. 6 is an exemplary flow diagram showing preparation of a boiler fuel when a separate source of readily ground biomass material is available.

Reference should now be made to FIG. 6. The process outlined here assumes that there is a source of easily ground biomass fuel such as bark from a mechanical or hydraulic barker. Alternatively, all or part of this readily ground material could be a material such as peat or even fly carbon recovered from boiler flue gases. The principal fuel component could be obtained from any convenient hog fuel source. The readily ground biomass is passed over a weigh feeder 36 to a screen 38 where oversize material grater than 6 mm is reduced in a hog 40. The combined streams are fed to a high air flow pulverizer 42. Product from the pulverizer is classified by any of the suitable well known devices 44 with oversize material being recycled to pulverizer 42 for additional size reduction.

Material from the hog fuel pile is run over a screen 46 which removes any large chunks. These are directed to a fluidized bed or other type of burner 48 which supplies hot gases to a dryer 50. If necessary, supplemental fuel can be provided for the fluidized bed burner 48. The accepted material from screen 46, normally less than 100 mm in maximum dimension, is dried in dryer 50 to a moisture content averaging about 15–25%. Typically the smaller particles will be below 15% moisture content while the larger ones may approach the high end of this range. The dried fuel is again classified on screen 52 with the fraction less than 10 mm in particle size being directed to a hog 55. Oversize material from screen 52 is directed through suitable three-way valves 54, 56 where it may be sent to the boiler grate, reground in hog 54 to contribute to the principal fuel component, or used as fuel for a hot air source 59 supplying heated gases to dry the ignition fuel component in pulverizer 42. The principal fuel component leaves hog 54 and is stored in bin 57 where it is withdrawn as needed over weigh feeder 58. This is then combined in a mixer 60 with the ignition fuel component. The mixed ignition and principal fuel components are directed in an appropriate air stream to a suspension fired burner in boiler 62.

Figure 7:
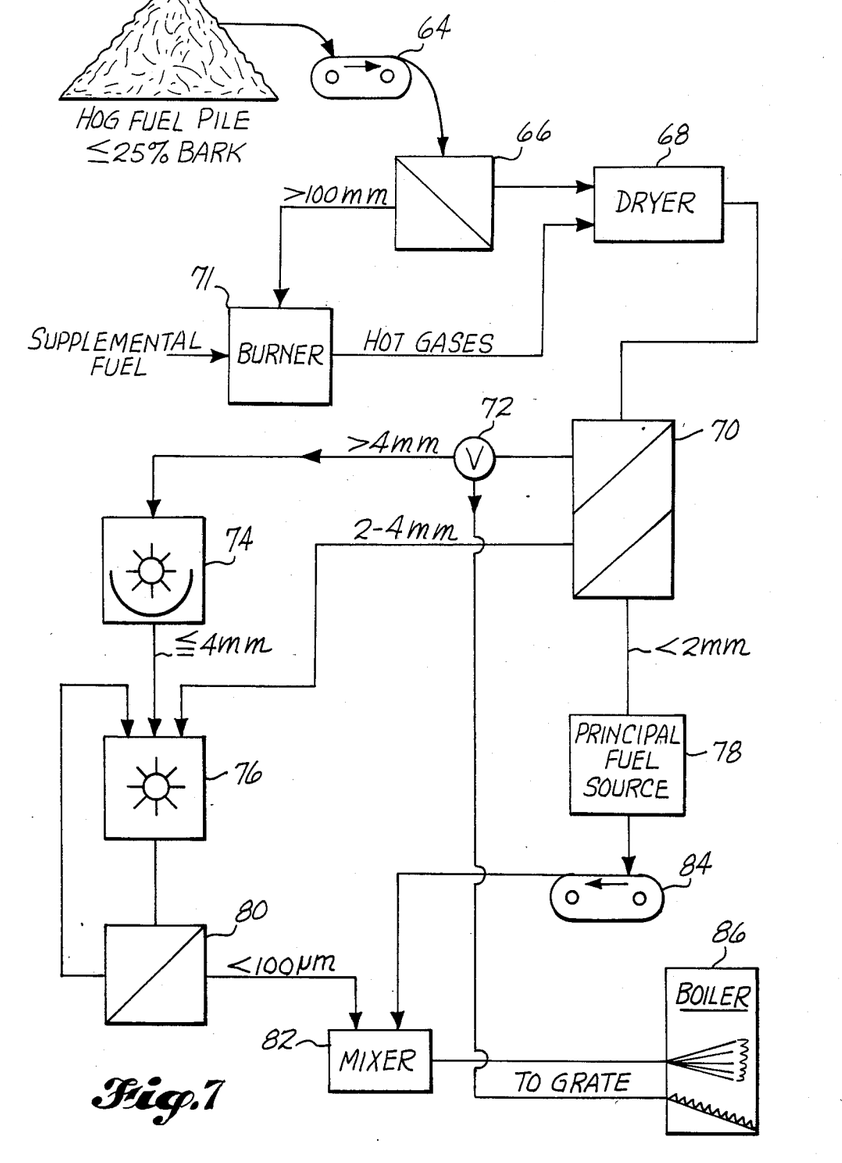
FIG. 7 is an exemplary flow diagram showing one method of preparation of a suspension fired fuel for a boiler having an integral grate.
Figure 8:
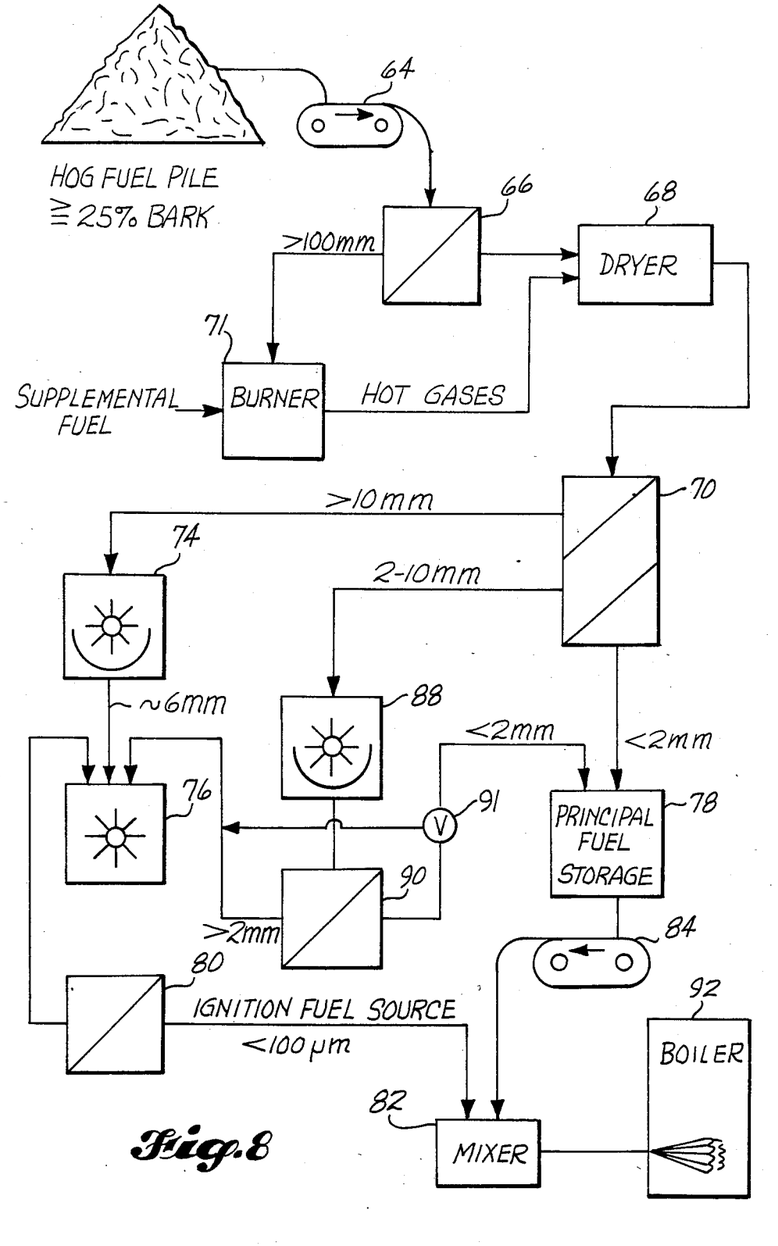
FIG. 8 is an exemplary flow diagram showing a method of fuel preparation for a boiler lacking a grate.
Figure 9:
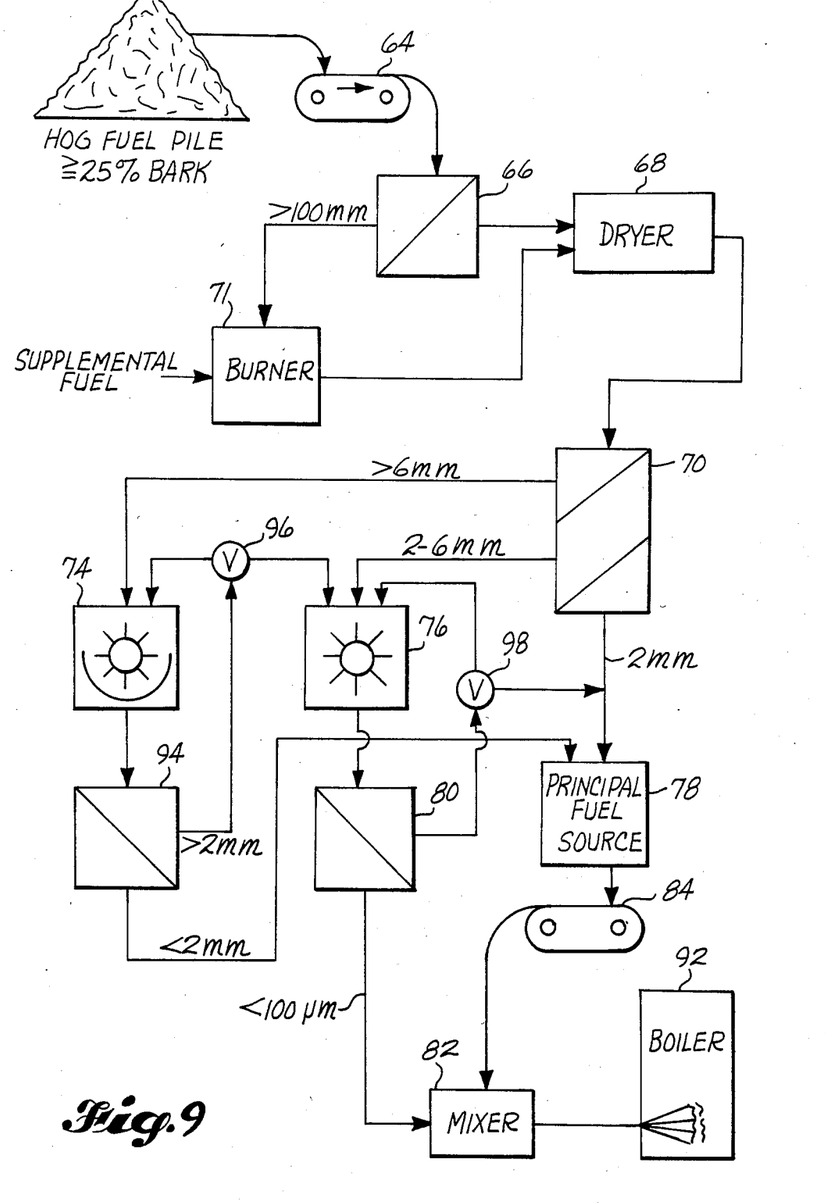
FIG. 9 is an alternative method to the process diagrammed in FIG. 8.

It is assumed in FIGS. 7–9 that the fuel source is a single hog fuel pile having at least 25% bark content. Material from the hog fuel pile is run over weigh feeder 64 to a screen 66. Oversize material greater than 100 mm is supplied to a burner 72, such as a fluidized bed chunk burner, where it may be combined with supplemental fuel to supply hot gases for a fuel dryer 68. The dried fuel moves to a double deck screen 70 where three fractions are obtained for further processing. To this point, with the exception that different screen sizes are used in screen deck 70, the processes shown in FIGS. 7–9 are identical.

For the process shown in FIG. 7, material greater than 4 mm in size is directed through a suitable valve 72 where it may be sent either to a boiler grate, if one is available, or to a hog 74 where it is reduced to less than 4 mm in size. The middle screen cut, 2–4 mm in size, is directed along with the product of hog 74 to a high air flow pulverizer 76. The fine material, less than 2 mm in size, from screen deck 70 is led to a storage bin 78 where it becomes the principal fuel component.

In the present case the coarser material from the hog fuel pile was purposely selected for processing into the fine ignition fuel component because typically it would be higher in the more readily ground bark (please refer to Table 1). The fine material less than 2 mm will normally be quite high in the harder to grind wood fiber. Further, no additional size reduction is necessary at this point, if the material is routed to the principal fuel stream.

Material from pulverizer 76 is separated into an accepted stream and a recycled stream by classifier 80. The fraction high ignition fuel component less than 100 μm in particle size is directed to a mixer 82. Here it is combined with the principal fuel component from storage bin 78 which enters the mixer after passing over weigh feeder 84. As before, the supply of ignition fuel is maintained essentially constant while the flow of principal fuel component is varied by weigh feeder 84 to accommodate burner load swings. Combined fuel from mixer 82 is directed to a suspension fired burner in boiler 86.

The process outlined in FIG. 8 is designed for use with a boiler that does not have a grate. The coarsest screen fraction from screen deck 70 is directed through hog 74 where it is reduced to a maximum particle size less than 6 mm. From here it flows to pulverizer 76. The middle fraction from screen deck 70 flows to a hog 88, with a 3 mm target size, and from there to screen deck 90. The coarser material from this screen deck, containing the highest percentage of bark, is also directed to pulverizer 76 while the fine material, less than 2 mm in particle size, is directed to the principal fuel storage bin 78 where it is combined with the finest particles from screen deck 70. A valve 91 enables a portion of the finer fraction to be diverted to the pulverizer, if this should be found necessary in order to provide sufficient ignition fuel. Outflow from pulverizer 76 is separated by classifier 80 into a recycle stream which is returned to the pulverizer and an ignition fuel component stream containing a suitable percentage of material less than 100 μm in paticle size. The ignition fuel component goes to mixer 82 where it is combined with the principal fuel component supplied over weigh feeder 84. From the mixer the combined fuels are supplied to a suspension fired burner 92. As before, weigh feeder 84 is controlled to accommodate burner load swings while the stream from pulverizer 76 is maintained at an essentially constant flow rate.

In FIG. 9, the oversize material greater than 6 mm from screen deck 70 is led to a hog 74 whose product is then classified on screen deck 94. Oversize material greater than 2 mm is sent through suitable valve 96 where it may either be recycled to hog 74 or directed to pulverizer 76. The undersize material less than 2 mm from screen 94 is sent to the principal fuel source surge bin 78 as is the undersize material less than 2 mm from screen deck 70. The 2–6 mm fraction from screen deck 70 forms the principal supply of material to pulverizer 76. Material from this pulverizer is separated into recycle streams and accepted streams by classifier 80. The recycle stream is directed through valve 98 where part or all of it may be diverted to the principal fuel source depending on need. The accepted ignition fuel component from classifier 80 is blended with the principal fuel component in mixer 82 where it is directed to suspension fired burner 92. The required amount of principal fuel component is controlled by weigh feeder 84.

The following examples compare the relative fuel preparation power requirements for a prior art Rivers-type process with the process of the present invention. For this comparison, the following assumptions are made. (1) The hog fuel supply was a mixture of 75% wood residue and 25% bark. (2) The hog fuel size fraction leaving the dryer that is larger than 3 mm contains about 50% bark. (3) The boiler is suspension fired only. Some particle carryover is the flue gases is permissible. (4) Dried hog fuel has approximately 15% moisture content. (5) Both processes use the same types of pulverizers and hammer hogs. Energy use is essentially the same regardless of whether the pulverizer is a high or low air flow type or whether the classifier is an internal or external type. (6) In both cases all material sent to the pulverizer goes through the pulverizer into the output stream. None of the pulverizer recycle stream is scalped off to a different stream. (7) Burners are operated at full load.

Figure 10:
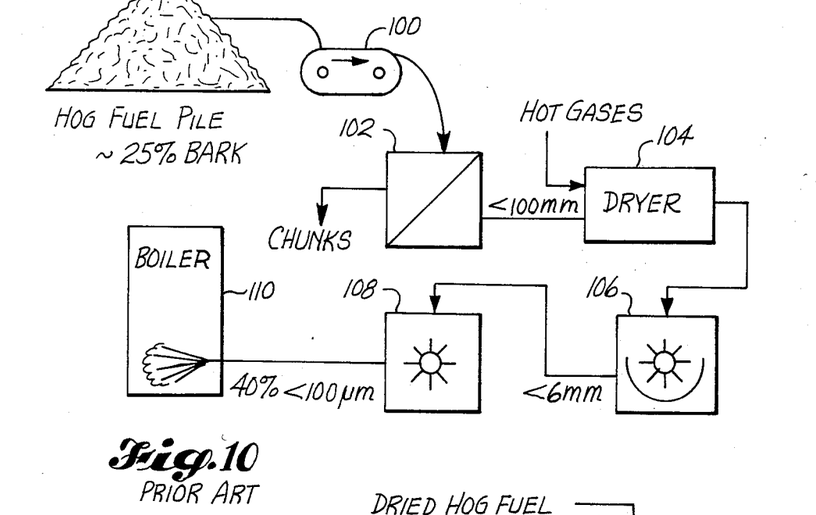
FIG. 10 is a simplified flow diagram of a prior art process using pulverized wood waste in an air suspension burner.

The Rivers et al. process is shown in a simplified form in FIG. 10. Hog fuel is directed over weigh feeder 100 onto a screen 102 that removes chunks larger than 100 mm. Material smaller than 100 mm is dried to approximately 15% average moisture content in hot gas dryer 104. The dried material is reduced in a hammer-type hog 106 so that no particles are larger than about 6 mm. The entire stream is then pulverized in a high speed impact mill 108 to give a product that is 40% less than 100 μm as measured by a Malvern Laser Particle Size Analyzer. This pulverized material is sent in a stream of primary air to a swirl stabilized suspension burner in boiler 110.

Figure 11:
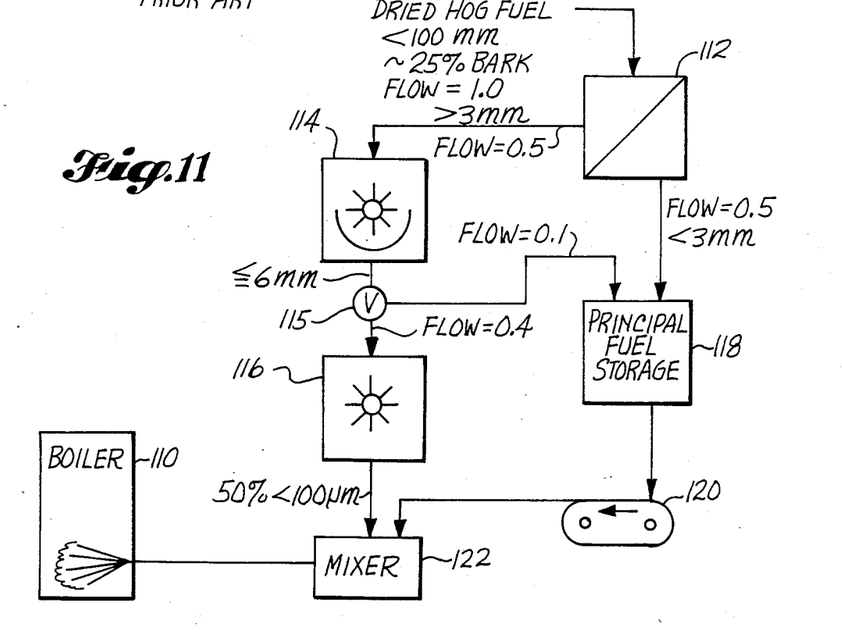
FIG. 11 is a comparable flow diagram to FIG. 10 using the process of the present invention.

The comparison process of the present invention, as shown in FIG. 11, is a slightly simplified version of the process of FIG. 7. The present version is designed for use with a boiler lacking a grate. Hog fuel preparation through the dryer 104 is the same as shown on FIG. 10 and is not represented on FIG. 11. The dried hog fuel is split into two fractions by screen 112. The fraction less than 3 mm, about half of the incoming stream, is sent to principal fuel storage. The oversize material larger than 3 mm is reduced in a hog 114 so that it will all pass a 6 mm screen. Three-way valve 115 may be used to divert a portion of the less than 6 mm stream, normally about 20% of this stream or 10% of the total hog fuel at full load, to balance the fuel streams. The majority, about 80% of the less than 6 mm fraction, is ground in a high speed impact mill 116 so that 50% is less than 100 μm by Malvern analysis. This forms the ignition fuel. The ignition and principal fuel streams are combined in mixer 122 from which they sent suspended in a primary air stream to boiler 110.

A fuel preparation power comparison is shown in Table IV.

TABLE IV

| Fuel Preparation Power Consumption - 25% Bark Hog Fuel | | |
|---|---|---|
|  | Rivers et al. Process | Process of Present Invention |
| Power for hogging[1] | 7 | 7(.5) = 3.5[2] |
| Power for fine pulverizing[1] | 95 | 60(.4) = 24.0[3] |
| Total power required[1] | 102 | 27.5 |
| Pulverizer size factor | 1.00 | 0.33 |

[1]kW · h/t of total fuel supplied to the burner.
[2]Only approximately 50% of the total fuel stream is hogged.
[3]Only approximately 40% of the total fuel stream is finely pulverized.

The major advantages of a nearly 75% reduction in comminution power per ton of fuel delivered to the burner and a two-thirds reduction in pulverizer size are immediately apparent. This advantage will decrease somewhat during times when the burner is operated at less than full load.

If a hog fuel pile having about 50% bark is available, the power requirement for both processes is reduced significantly. The one new assumption being made here is that the stream from screen 112 to pulverizer 114 of FIG. 11 will now comprise nearly 100% bark. Table V shows power requirement comparisons under these circumstances.

TABLE V

| Fuel Preparation Power Consumption - 50% Bark Hog Fuel | | |
|---|---|---|
|  | Rivers et al. Process | Process of Present Invention |
| Power for hogging[1] | 7 | 7(.5) = 3.5[2] |
| Power for fine pulverizing[1] | 35 | 51(.4) = 20.4[3] |
| Total power required[1] | 42 | 23.9 |
| Pulverizer size factor | 0.63 | 0.25 |

[1]kW · h/t of total fuel supplied to the burner.
[2]Only approximately 50% of the total fuel stream is hogged.
[3]Only approximately 40% of the total fuel stream is finely pulverized.

Even with the more favorably constituted fuel source, major operating power savings and pulverizer installation size advantages are again noted for the present process.

Pulverizer size factor is a function of the total feed stream plus any recycle stream from an internal or external classifier (see FIG. 4). It relates directly to the physical size and/or number of pulverizers required.

Having thus disclosed the best modes known to the inventors of carrying out the present process, it will be readily apparent to those skilled in the art that many variations can be made without departing from the spirit of the invention. As one example, the air suspension burner need not be in a boiler but could be installed in a kiln or in other direct fired equipment where high amounts of heat energy are required. As noted before, the processes described are exemplary and may have to be tailored and optimized for each individual installation. With the advantage of the inventor's specification in hand, this will be fully within the skill of a competent engineer. The invention is thus considered to be limited only by the following claims.

We claim:

1. A process for reducing comminution energy required for preparation of a biomass fuel source containing a mixture of materials having differing friability into a particulate fuel capable of self-sustaining combustion in an air suspension fired burner which comprises:

providing a principal fuel component from the fuel source in which at least about 90% by weight of the particles do not exceed about 10 mm in any dimension and the moisture content does not exceed about 25%;

selecting a sufficient quantity of the more friable material from the fuel source and drying and comminuting this material to provide an ignition component having a particle size not exceeding about 100 μm diameter and a moisture content not exceeding about 15% in an amount equivalent to at least 10% of the total heat value of the combined principal and ignition fuel components; and adjusting the ratio of principal and ignition fuel components so that when both are fired in an air suspension-type burner the ignition component provides sufficient energy to the principal fuel component to maintain stable combustion, whereby during fuel preparation only a predetermined amount of the most friable material need be finely comminuted thereby reducing the overall energy required for fuel preparation.

2. The process of claim 1 which further comprises providing the ignition fuel component in an amount equivalent to at least 20% of the total heat value of the combined fuel materials.

3. The process of claim 1 which further comprises combining the principal and ignition fuel components prior to delivery to a burner.

4. The process of claim 1 which further comprises maintaining the principal and ignition fuel components separate prior to delivery to a burner.

5. The process of claim 1 in which the biomass fuel source is a hog fuel comprising a mixture of wood and bark.

6. The process of claim 5 which further comprises providing a bark enriched stream to produce the ignition component material.

7. The process of claim 5 in which the biomass fuel further includes char as at least a portion of the material comminuted to produce the ignition fuel component.

8. The process of claim 5 in which the biomass fuel further includes peat as at least a portion of the material comminuted to produce the ignition fuel component.

9. The process of claim 5 which further comprises screening the material from the hog fuel pile to obtain a fraction falling in the principal fuel component size range than comminuting only the required amount of oversize material to produce the balance of the required principal fuel component.

10. The process of claim 1 which further comprises providing a principal fuel component in which the particles do not exceed about 1 mm in thickness.

11. The process of claim 10 which further comprises providing a principal fuel component in which the particles do not exceed about 4 mm in any dimension.

12. The process of claim 1 in which the burner is used in combination with a water-wall or other cold wall-type boiler.

13. The process of claim 6 which further includes comminuting the bark enriched stream in a high air flow impact-type pulverizer and classifying the product stream to produce a bark enriched ignition component fraction having a particle size with a diameter less than 100 μm and a relatively coarser fiber enriched fraction which may be recycled through the pulverizer or directed to the principal fuel component stream.

14. The process of claim 13 which further includes directing a heated gas stream along with the material entering the pulverizer in order to effect drying of the comminuted product.

15. The process of claim 13 which further includes classifying the pulverized product external to the pulverizer, said classification being carried out in a gas stream on the basis of particle mass and size.

16. The process of claim 1 which further includes first screening the biomass fuel source to remove any particles less than about 2 mm in size and diverting said less than 2 mm particles directly to the principal fuel component without further size reduction.

* * * * *

UNITED STATES PATENT AND TRADEMARK OFFICE
CERTIFICATE OF CORRECTION

PATENT NO. : 4,589,357
DATED : May 20, 1986
INVENTOR(S) : James F. L. Lincoln et al.

It is certified that error appears in the above—identified patent and that said Letters Patent is hereby corrected as shown below:

In column 9, line 28, ">100 µm" should read --<100 µm--;

In column 9, line 30, "<1000 µm" should read -->1000 µm--;

In column 13, line 47, "grater" should read --greater--;

In column 14, line 14, "burner 72" should read --burner 71--;

In column 14, line 45, "after passing over" should read --after having passed over--;

In column 15, line 38, "carryover is" should read --carryover in--.

Signed and Sealed this

Twenty-fifth Day of November, 1986

*Attest:*

DONALD J. QUIGG

*Attesting Officer*   Commissioner of Patents and Trademarks